United States Patent [19]

Omachi

[11] Patent Number: 4,636,783
[45] Date of Patent: Jan. 13, 1987

[54] DEVICE FOR GIVING A PATTERN A ROTATION OF AN INTEGRAL MULTIPLE OF 90° WITH THE PATTERN READ FROM A MEMORY ON A BLOCK BY BLOCK BASIS

[75] Inventor: Takao Omachi, Tokyo, Japan
[73] Assignee: NEC Corporation, Tokyo, Japan
[21] Appl. No.: 475,982
[22] Filed: Mar. 16, 1983

[30] Foreign Application Priority Data

Mar. 17, 1982 [JP] Japan .................. 57-41879

[51] Int. Cl.⁴ ............................................ G09G 1/06
[52] U.S. Cl. .................................... 340/727; 340/723; 340/724; 340/799; 382/46
[58] Field of Search ............... 340/723, 724, 727, 750, 340/798, 799; 382/46

[56] References Cited

U.S. PATENT DOCUMENTS

| | | | |
|---|---|---|---|
| 3,921,135 | 11/1975 | Komaru et al. | 340/750 |
| 3,976,982 | 8/1976 | Eiselen | 340/727 |
| 4,127,850 | 11/1978 | Vallins | 340/727 |
| 4,168,488 | 9/1979 | Evans | 340/727 |
| 4,225,929 | 9/1980 | Ikeda | 340/727 |
| 4,356,482 | 10/1982 | Ognchi | 340/799 |
| 4,454,593 | 6/1984 | Fleming et al. | 340/723 |
| 4,484,192 | 11/1984 | Seitz et al. | 340/727 |

Primary Examiner—Gerald L. Brigance
Assistant Examiner—Jeffery A. Brier
Attorney, Agent, or Firm—Sughrue, Mion, Zinn, Macpeak & Seas

[57] ABSTRACT

An original pattern stored in a first memory, is read out in read-out blocks. A rotated pattern, namely, the original pattern given a rotation of one of 0°, 90°, 180°, and 270° that is selected by a selection signal, is written in a second memory in write-in blocks. Each of the read-out and write-in blocks consists preferably of N N-bit words, where N represents a predetermined integer. The write-in block in which a read-out block should be written with the rotation, is selected by the selection signal. Each read-out block is stored in an array of shift registers for the respective words of the block and successively read out stage by stage into a loading circuit for the second memory as words of one of the write-in blocks when the rotation is 90° or 270°. Words of each read-out block may directly be transferred to the loading circuit when the rotation is 0° or 180°. The loading circuit is controlled by the selection signal on loading the second memory with each word of the write-in block. The second memory may be the memory used as the first memory. In this case, a buffer memory should be used in temporarily keeping the read-out block in which one of the write-in blocks should be written. The buffer memory is preferably another shift register array which is alternatingly used in combination with the first-mentioned shift register array.

1 Claim, 12 Drawing Figures

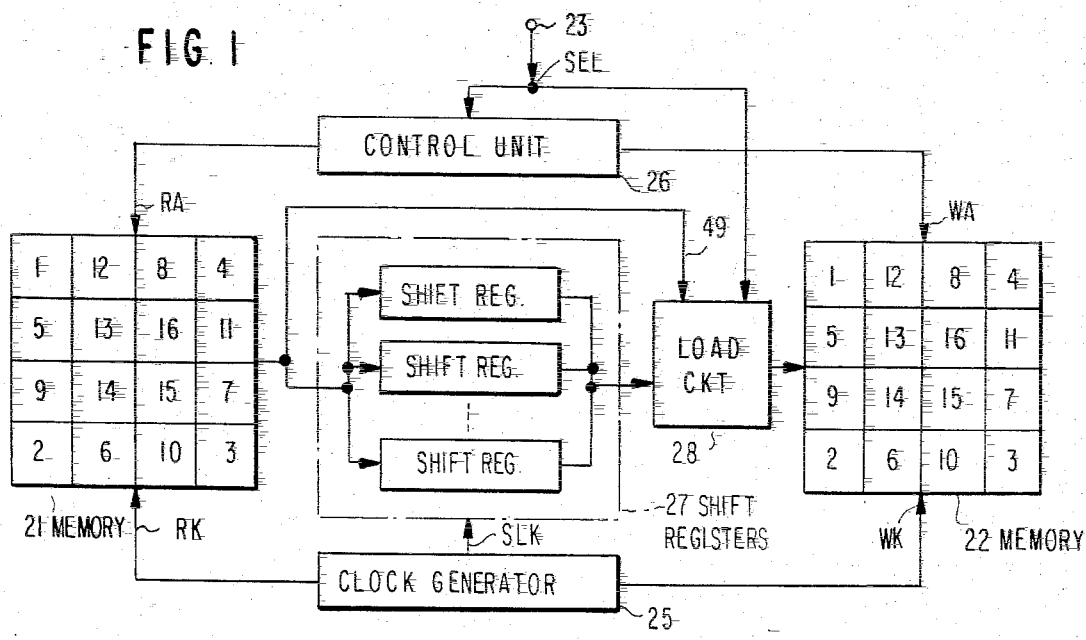
FIG. I
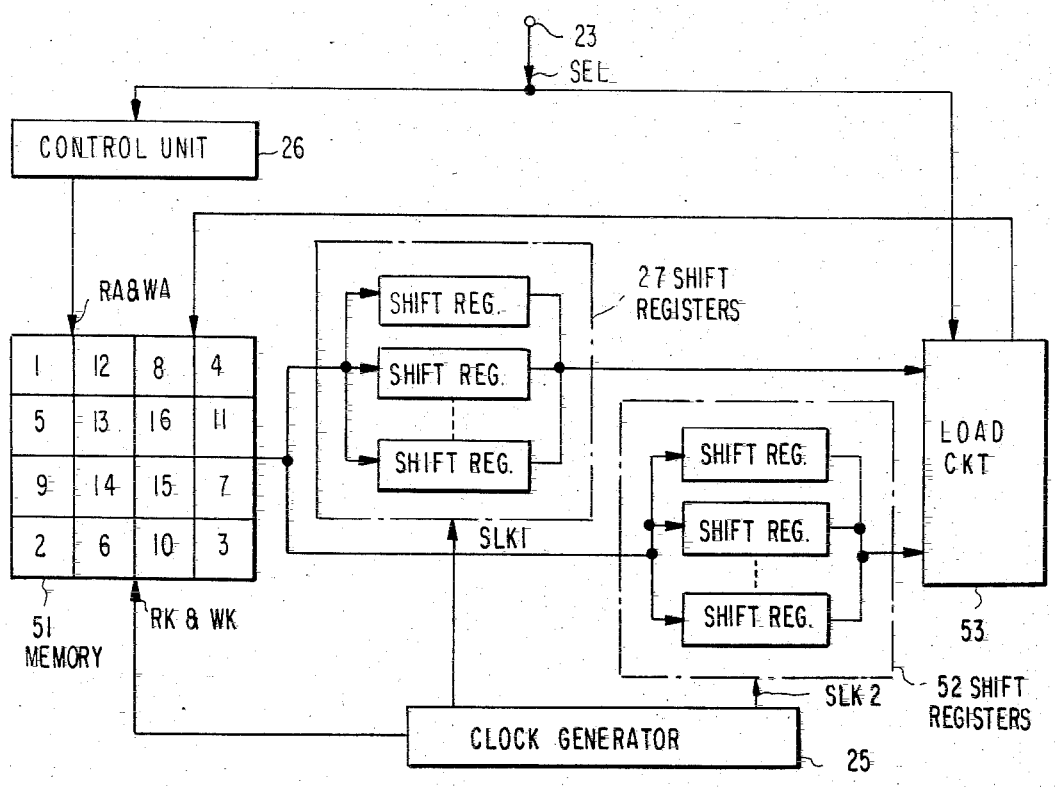
FIG. II

FIG. 2
FIG. 6
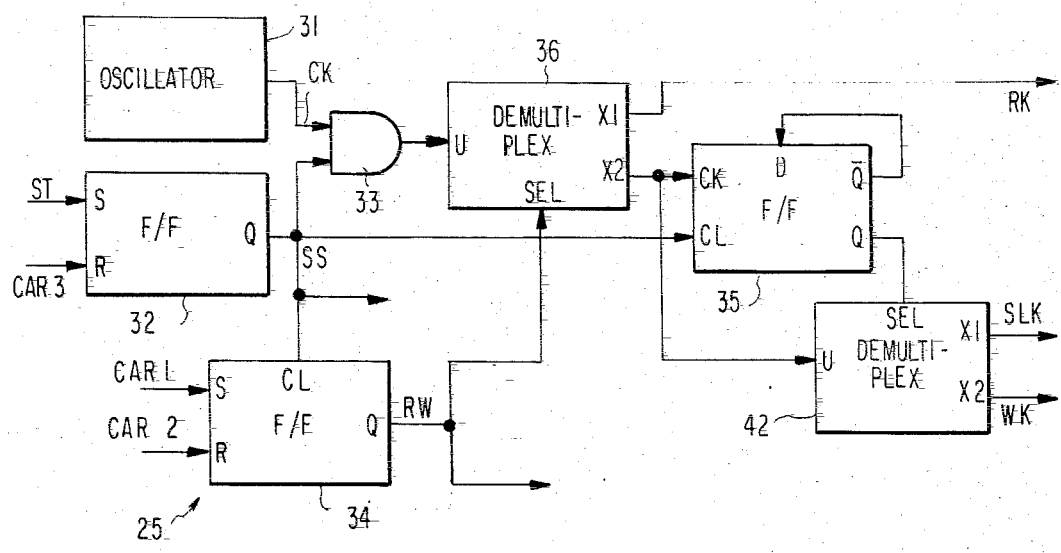
FIG. 12
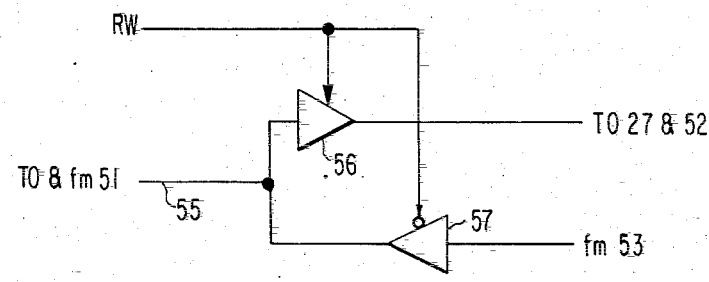

FIG. 3A

| A8 | B8 | C8 | D8 | E8 | F8 | G8 | H8 |
|---|---|---|---|---|---|---|---|
| A7 | B7 | C7 | D7 | E7 | F7 | G7 | H7 |
| A6 | B6 | C6 | D6 | E6 | F6 | G6 | H6 |
| A5 | B5 | C5 | D5 | E5 | F5 | G5 | H5 |
| A4 | B4 | C4 | D4 | E4 | F4 | G4 | H4 |
| A3 | B3 | C3 | D3 | E3 | F3 | G3 | H3 |
| A2 | B2 | C2 | D2 | E2 | F2 | G2 | H2 |
| A1 | B1 | C1 | D1 | E1 | F1 | G1 | H1 |

FIG. 3B

| READ-OUT BLOCK | WRITE-IN BLOCK |
|---|---|
| 1 | 2 |
| 2 | 3 |
| 3 | 4 |
| 4 | 1 |
| 5 | 6 |
| 6 | 7 |
| 7 | 8 |
| 8 | 5 |
| 9 | 10 |
| 10 | 11 |
| 11 | 12 |
| 12 | 9 |
| 13 | 14 |
| 14 | 15 |
| 15 | 16 |
| 16 | 13 |

FIG. 4A

| H1 | G1 | F1 | E1 | D1 | C1 | B1 | A1 |
|---|---|---|---|---|---|---|---|
| H2 | G2 | F2 | E2 | D2 | C2 | B2 | A2 |
| H3 | G3 | F3 | E3 | D3 | C3 | B3 | A3 |
| H4 | G4 | F4 | E4 | D4 | C4 | B4 | A4 |
| H5 | G5 | F5 | E5 | D5 | C5 | B5 | A5 |
| H6 | G6 | F6 | E6 | D6 | C6 | B6 | A6 |
| H7 | G7 | F7 | E7 | D7 | C7 | B7 | A7 |
| H8 | G8 | F8 | E8 | D8 | C8 | B8 | A8 |

FIG. 4B

| READ-OUT BLOCK | WRITE-IN BLOCK |
|---|---|
| 1 | 4 |
| 2 | 2 |
| 3 | 1 |
| 4 | 3 |
| 5 | 8 |
| 6 | 5 |
| 7 | 6 |
| 8 | 7 |
| 9 | 12 |
| 10 | 9 |
| 11 | 10 |
| 12 | 11 |
| 13 | 16 |
| 14 | 13 |
| 15 | 14 |
| 16 | 15 |

FIG. 5A

| H8 | H7 | H6 | H5 | H4 | H3 | H2 | H1 |
|---|---|---|---|---|---|---|---|
| G8 | G7 | G6 | G5 | G4 | G3 | G2 | G1 |
| F8 | F7 | F6 | F5 | F4 | F3 | F2 | F1 |
| E8 | E7 | E6 | E5 | E4 | E3 | E2 | E1 |
| D8 | D7 | D6 | D5 | D4 | D3 | D2 | D1 |
| C8 | C7 | C6 | C5 | C4 | C3 | C2 | C1 |
| B8 | B7 | B6 | B5 | B4 | B3 | B2 | B1 |
| A8 | A7 | A6 | A5 | A4 | A3 | A2 | A1 |

FIG. 5B

| READ-OUT BLOCK | WRITE-IN BLOCK |
|---|---|
| 1 | 3 |
| 2 | 4 |
| 3 | 1 |
| 4 | 2 |
| 5 | 7 |
| 6 | 8 |
| 7 | 5 |
| 8 | 6 |
| 9 | 11 |
| 10 | 12 |
| 11 | 9 |
| 12 | 10 |
| 13 | 15 |
| 14 | 16 |
| 15 | 13 |
| 16 | 14 |

FIG. 8

| ADDRESS | READ ROM 39 | | | WRITE ROM 45 | | |
|---|---|---|---|---|---|---|
| | K6 K5 | K1 K0 | (BLOCK) | K6 K5 | K1 K0 | (BLOCK) |
| 0 0 0 0 | 0 0 | 0 0 | (1) | 1 1 | 0 0 | (2) |
| 0 0 0 1 | 1 1 | 0 0 | (2) | 1 1 | 1 1 | (3) |
| 0 0 1 0 | 1 1 | 1 1 | (3) | 0 0 | 1 1 | (4) |
| 0 0 1 1 | 0 0 | 1 1 | (4) | 0 0 | 0 0 | (1) |
| 0 1 0 0 | 0 1 | 0 0 | (5) | 1 1 | 0 1 | (6) |
| 0 1 0 1 | 1 1 | 0 1 | (6) | 1 0 | 1 1 | (7) |
| 0 1 1 0 | 1 0 | 1 1 | (7) | 0 0 | 1 0 | (8) |
| 0 1 1 1 | 0 0 | 1 0 | (8) | 0 1 | 0 0 | (5) |
| 1 0 0 0 | 1 0 | 0 0 | (9) | 1 1 | 1 0 | (10) |
| 1 0 0 1 | 1 1 | 1 0 | (10) | 0 1 | 1 1 | (11) |
| 1 0 1 0 | 0 1 | 1 1 | (11) | 0 0 | 0 1 | (12) |
| 1 0 1 1 | 0 0 | 0 1 | (12) | 1 0 | 0 0 | (9) |
| 1 1 0 0 | 0 1 | 0 1 | (13) | 1 0 | 0 1 | (14) |
| 1 1 0 1 | 1 0 | 0 1 | (14) | 1 0 | 1 0 | (15) |
| 1 1 1 0 | 1 0 | 1 0 | (15) | 0 1 | 1 0 | (16) |
| 1 1 1 1 | 0 1 | 1 0 | (16) | 0 1 | 0 1 | (13) |

__NUM__4,636,783__NUM__

DEVICE FOR GIVING A PATTERN A ROTATION OF AN INTEGRAL MULTIPLE OF 90° WITH THE PATTERN READ FROM A MEMORY ON A BLOCK BY BLOCK BASIS

BACKGROUND OF THE INVENTION

This invention relates to a device for giving a pattern a rotation which is selected from integral multiples of 90°. A pattern rotating device of this type is useful, for example, in rotating either a scene to be displayed on a cathode-ray tube or a part thereof.

Such a rotation of an original pattern may be carried out by the use of software, as by resorting to a microprocessor with the pattern stored in a memory preliminarily before rotation. In general, the memory must have a large memory capacity. A long processing time is therefore necessary on carrying out the rotation by software. For instance, the memory capacity must be about four megabits when a black and white pattern of the size of ISO A4 is stored in the memory with a resolution of eight lines per millimeter. Under the circumstances, it takes more than one minute of time when an eight-bit microprocessor is put into operation with a sequence of reference clocks of 4 MHz.

A hardware device is revealed in Japanese Patent Publication No. Syo 56-18989 published May 2, 1981. As will later be described in conjunction with an embodiment of the present invention with reference to one of twelve figures of the accompanying drawing, a predetermined number of unit shift registers are used according to the patent publication. An original pattern to be rotated, is read into the shift registers. A rotated pattern is obtained by reading the shift registers in a predetermined order. The patent publication merely teaches a numeral as the "pattern." The numeral is represented by, for example, a matrix of seven by five dots or picture elements. In this event, the shift registers may be seven in number.

SUMMARY OF THE INVENTION

It is an object of the present invention to provide an improved hardward device for use in giving a pattern a rotation which is selected from integral multiples of 90°.

It is another object of this invention to provide a pattern rotating device of the type described, by which it is possible to carry out the rotation in an unexpectedly short interval of time.

According to this invention, there is provided a device which is for use in giving an original pattern a rotation of a preselected one of integral multiples of 90° to provide a rotated pattern and comprises memory means, first and second reading means, shift register means, and loading means as follows.

The memory means is for storing the original pattern in read-out blocks, each consisting of N M-bit words, where N and M are representative of first and second predetermined natural numbers, respectively. The memory means is furthermore for storing the rotated pattern in write-in blocks which are in one-to-one correspondence to the read-out blocks in compliance with the rotation. Each write-in block consists of M N-bit words.

The first reading means is for reading the memory means to successively produce the read-out blocks.

The shift register means is for storing each read-out block read out of the memory means.

The second reading means is for reading the shift register means to successively produce M N-bit words.

The loading means is for successively writing the M N-bit words read out of said shift register means in the write-in block corresponding in compliance with the above-mentioned rotation to the read-out block which is stored in the shift register means and read out thereof as the M N-bit words. The loading means thereby successively writes the read-out blocks in the write-in blocks which are in the afore-said correspondence to the read-out blocks, respectively.

BRIEF DESCRIPTION OF THE DRAWING

FIG. 1 is a block diagram of a pattern rotating device according to a first embodiment of the instant invention;

FIG. 2 shows a block of a memory used in the pattern rotating device depicted in FIG. 1;

FIG. 3 shows diagrams for use in describing a counterclockwise rotation of 90° of an original pattern;

FIG. 4 shows diagrams for use in describing a clockwise rotation of 90° of the pattern;

FIG. 5 shows diagrams for use in describing a 180° rotation of the pattern;

FIG. 6 is a block diagram of a clock generator for use in the pattern rotating device shown in FIG. 1;

FIG. 8 shows address signals for the respective blocks of memories used in the pattern rotating device illustrated in FIG. 1;

FIG. 11 is a block diagram of a pattern rotating device according to a second embodiment of this invention; and FIG. 12 is a block diagram of a part of the pattern rotating device depicted in FIG. 11.

DESCRIPTION OF THE PREFERRED EMBODIMENTS

Figure 7:
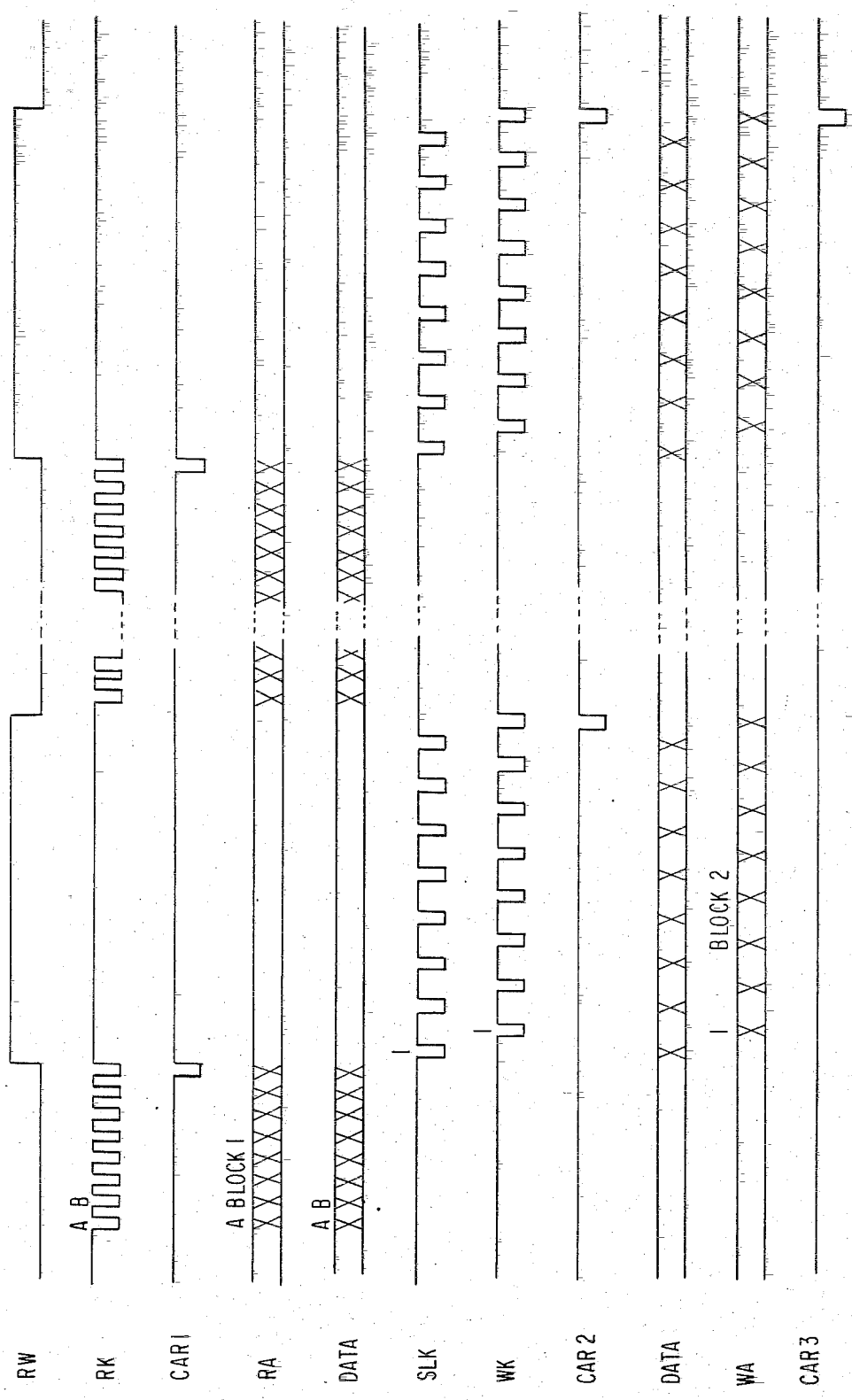
FIG. 7 schematically shows several signals for use in describing operation of the pattern rotating device depicted in FIG. 1.

Referring to FIGS. 1 and 2, a pattern rotating device according to a first embodiment of the present invention comprises a first memory 21 for preliminarily storing a first signal representative of an original pattern to be rotated and a second memory 22 in which a rotated pattern is written. It will be assumed merely for brevity of description that the original pattern is a black and white pattern. Each of the first and the second signals may therefore be a sequence of binary bits representative of picture elements of the original or the rotated pattern. It will furthermore be assumed that each pattern is square in outline and that each of the memories 21 and 22 is capable of two-dimensionally memorizing the binary bit sequence in the form of an overall matrix of thirty-two by thirty-two bits.

As will later be described more in detail, the picture elements or the binary bits are read out of the first memory 21 and written in the second memory 22 on a block by block basis. Each block consists of a partial matrix of eight by eight bits. It is possible to identify the blocks by rows and columns of a matrix of blocks. In the example bing illustrated, the columns are numbered from first to fourth from left to right. The rows are numbered from first to fourth from the top to the bottom. The blocks may also be identified by consecutive numbers. As will become clear as the description proceeds, it is convenient to number the blocks as indicated in FIG. 1. Such a memory may be any one of an IC memory, a disk memory, or a like memory. It will be presumed as depicted in FIG. 2 that each block of the first memory 21 consists of first through eighth words A, B, ..., and H, each consisting of first through eighth bits 1, 2, ..., and 8. The picture elements or binary bits in each block will be identified as A1, A2, ..., A8, B1, B2, ..., and H8.

Referring also to FIGS. 3 through 5, a selection terminal 23 is for receiving a selection signal SEL which is manually or otherwise generated to indicate one of integral multiples of 90° of rotation, such as 0°, 90°, 180°, and 270°. When the selection signal SEL is indicative of a counterclockwise rotation of 90°, the picture elements or binary bits in each block shown in FIG. 2, are rearranged as depicted in FIG. 3(A). The blocks read out of the first memory 21 are written in the respective blocks of the second memory 22 as indicated in FIG. 3(B). When the selection signal SEL indicates a clockwise rotation of 90°, namely, a counterclockwise rotation of 270°, the picture elements of each block illustrated in FIG. 2, are rearranged into the illustration in FIG. 4(A). The blocks read from the first memory 21 are read into the blocks of the second memory 22, respectively. as depicted in FIG. 4(B). If the selection signal SEL indicates a rotation of 180°, each block is given a 180° rotation as will be understood from FIG. 2 and FIG. 5(A). The blocks are successively read from the first memory 21 and read in the blocks of the second memory 22 as shown in FIG. 1 and FIG. 5(B).

In order so to deal with the picture elements or binary bits, a clock generator 25 generates a sequence of read clocks RK and a sequence of write clocks WK. The read and the write clock sequences RK and WK are delivered to the first and the second memories 21 and 22, respectively. Supplied with the selection signal SEL, a control unit 26 produces read and write address signals RA and WA as will presently be described more in detail. The read and the write address signals RA and WA are fed to the first and the second memories 21 and 22, respectively.

A shift register array 27 is for the picture elements or binary bits of each block of the first memory 21. For the example being illustrated, the shift register array 27 is composed of first through eighth unit shift registers for the first through the eighth words A to H (FIG. 2), respectively. Each unit shift register has first through eighth stages for the first through the eighth bits 1 to 8 (FIG. 2), respectively. As will shortly be described in detail, the clock generator 25 furthermore generates a sequence of shift and load clocks SLK. The shift and load clock sequence SLK is supplied to the shift register array 27 and to a load circuit 28, which will become clear as the description proceeds. Connection between the clock generator 25 and the load circuit 28 is omitted in FIG. 1 merely for simplicity of illustration.

According to the patent publication referred to hereinabove, a signal representative of a numeral is read into a shift register array of the type of the illustrated array 27. Another signal representative of a rotated numeral is obtained by reading the shift register array in a predetermined order.

Turning to FIGS. 6 and 7, the clock generator 25 comprises an oscillator 31 for generating a sequence of reference clocks CK. A start pulse ST is manually or otherwise supplied to a set input S of a start-stop flip-flop 32 to set the same. A start-stop signal SS is produced from its Q output with a high level to put the pattern rotating device into operation. The high start-stop signal SS enables an AND gate 33 and is fed to clear inputs CL's of read-write and timing flip-flops 34 and 35. When cleared, the read-write flip-flop 34 produces a read-write signal RW (depicted also in FIG. 7) from its Q output with a low level, which is indicative of a read interval of time. The AND gate 33 supplies the reference clocks CK to a U input of a first demultiplexer 36 having first and second outputs X1 and X2. The low read-write signal RW is fed to a selection input SEL (the same reference symbol as the selection signal SEL being used) of the demultiplexer 36 to make the same produce every eighth reference clock from the first output X1 as a demultiplexed clock. An intermittent sequence of read clocks RK (FIG. 7) is formed of the demultiplexed clocks as will presently become clear. As described before, the read clock sequence RK is delivered to the first memory 21.

Figure 8:
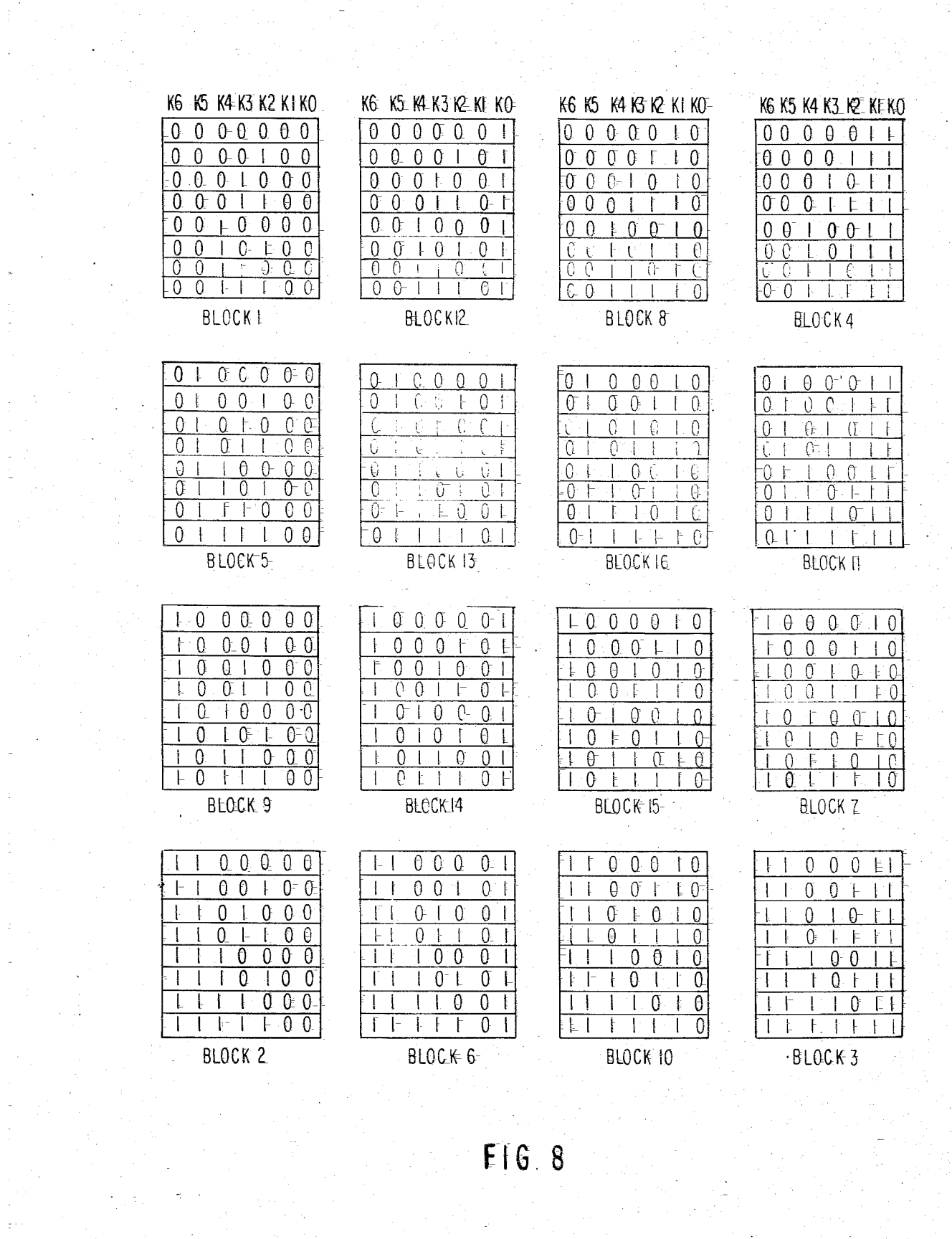

Further turning to FIG. 8, each of the read and the write addresss signals RA and WA is a sequence of address words. Each address word consists of zeroth through seventh bits K0, K1, ..., and K7. The seventh bit K7 (not shown) indicates read and write by O and 1, respectively. The sixth and the fifth bits K6 and K5 are for addressing one of the first through the fourth rows of the matrix of blocks. The first and the zeroth bits K1 and K0 are for addressing one of the first through the fourth columns of the matrix of blocks. The fourth through the second bits K4, K3, and K2 are for addressing one of the first through the eighth words A to H (FIG. 2) of each block of the memories 21 and 22. Incidentally, words in each block of the second memory 22 depicted at (A) in FIGS. 3 through 5, will be numbered as first through eighth 1 to 8 from the top to the bottom.

Figures 9, 10:
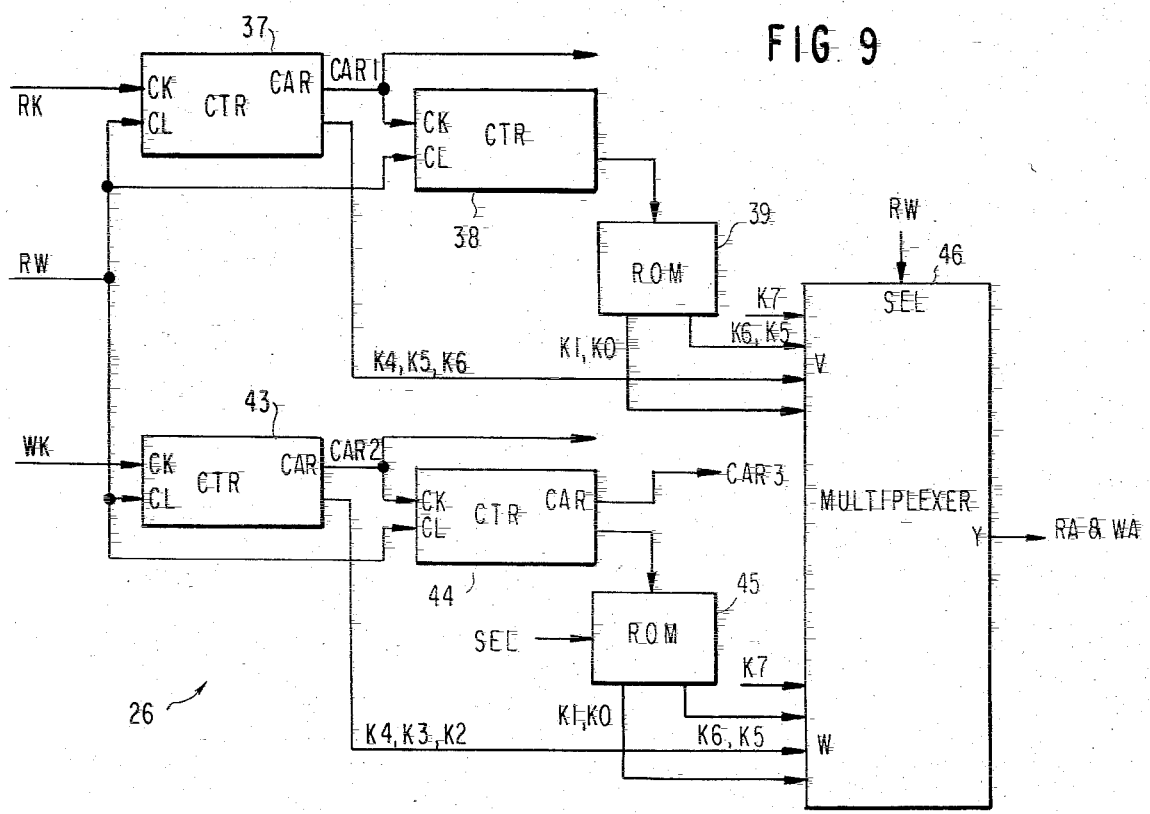
FIG. 9 is a block diagram of a control unit for use in the pattern rotating device shown in FIG. 1.
FIG. 10 shows read-only memories for use in the control unit illustrated in FIG. 9.

Referring to FIGS. 9 and 10 in addition to FIG. 7, the control unit 26 comprises a three-bit read counter 37 having a clear input CL supplied with the read-write signal RW from the clock generator 25 through a connection not shown in FIG. 1. Whenever the read-write signal RW builds down, the counter 37 is cleared and begins to count the read clocks RK supplied to a clock input CK (the same reference symbol as the reference clocks CK being used). When the count reaches a full count of seven, the counter 37 produces a first carry pulse CAR1 (depicted also in FIG. 7) from a carry output CAR. In the meanwhile, the counter 37 produces the second through the fourth bits K2 to K4 of the read address signal RA. The read-write signal RW is supplied also to a four-bit read counter 38. Whenever the read-write signal RW builds down, the four-bit counter 38 counts the carry pulses CAR1. The count in the four-bit counter 38 is used as an ROM (read-only memory) address signal for a read ROM 39. The ROM 39 produces the sixth, fifth, first, and zeroth bits K6, K5, K1, and K0 of the read address signal RA as indicated in the left column of FIG. 10.

Turning back to FIGS. 6 and 7, the first carry pulse CAR1 is supplied to a set input S of the read-write flip-flop 34. The read-write signal RW is switched to a high level, which indicates a write interval of time. The high read-write signal RW makes the demultiplexer 36 produce the demultiplexed clock from the second output X2. In addition to the clear input CL described above, the timing flip-flop 35 has a clock input CK supplied with the demultiplexed clocks and an inverted Q output $\overline{Q}$ connected to a D input. The timing flip-flop 35 therefore produces a sequence of demultiplexed and then inverted clocks from a Q output. A second demultiplexer 42 has a U input supplied with the demultiplexed clocks from the second output X2 of the first demultiplexer 36. Supplied with the demultiplexed and then inverted clocks at a selection input SEL, the second demultiplexer 42 alternatingly produces the demultiplexed clocks from first and second outputs X1 and X2 as the shift and load clocks SLK and the write clocks WK (FIG. 7), respectively. As described above, the write clocks WK are delivered to the second memory 22. The shift and load clocks SLK are fed to the shift register array 27 and the load circuit 28.

Referring back to FIGS. 9 and 10 and referring again to FIG. 7, a three-bit write counter 43 is cleared upon build-up of the read-write signal RW and begins to count the write clocks WK. The three-bit write counter 43 produces a second carry pulse CAR2 when the count reaches the full count and, in the meantime, the fourth through the second bits K4, K3, and K2 of the write address signal WA. The second carry pulses CAR2 are counted by a four-bit write counter 44, which produces a third carry pulse CAR3 when the count reaches a full count of fifteen and, meanwhile, another ROM address signal. A write ROM 45 is controlled by the selection signal SEL. Supplied with the ROM address signal from the four-bit write counter 44, the ROM 45 produces the sixth, fifth, first, and zeroth bits K6, K5, K1, and K0 of the write address signal WA according to the right column of FIG. 10, which is in harmony with FIG. 3(B), if the selection signal SEL indicates the counterclockwise rotation of 90°. The bits to be produced from the write ROM 45 will now readily be programmed according to FIGS. 4(B) and 5(B) for the selection signal SEL indicative of the 90° clockwise and the 180° rotations.

A multiplexer 46 has a selection input SEL, to which the read-write signal RW is supplied from the clock generator 25. When the read-write signal RW takes the low and the high levels, the seventh bit K7 of the read or the write address signal RA or WA is given low or high levels (0 or 1), respectively. The multiplexer 46 furthermore has first and second inputs V and W and a single output Y. As will now readily be understood, the multiplexer 46 produces the read or the write address signal RA or WA.

Referring to FIGS. 6 and 7 once again, the second carry pulses CAR2 are delivered to a reset input R of the read-write flip-flop 34 to reset the same and to make the read-write signal RW have the low level. The third carry pulse CAR3 is fed to a reset input R of the start-stop flip-flop 32 to make the start-stop signal SS take a low level, which puts the pattern rotating device in a state of waiting a new start pulse ST. It may be pointed out here that each of the counters 38 and 44 may be a counter of a full count which is manually or otherwise adjustable. In this event, the ROM's 39 and 45 should have addresses other than those depicted in FIG. 10. Such counters 38 and 44 and ROM's 39 and 45 are for optionally selecting the number of cycles of the read-out and write-in intervals.

Referring farther back to FIGS. 1 and 2 and referring once more to FIG. 7, it will now be assumed that the read address signal RA indicates the first word A in the first column-first row block 1 of the first memory 21. Responsive to a first read clock A (FIG. 7) of the read clock sequence RK, the first word A is moved to the eighth unit shift register of the shift register array 27. When a second read clock B (FIG. 7) is produced, the first word A is moved from the eighth unit shift register into the seventh unit shift register (not shown). At the same time, the second word B is read into the eighth unit shift register from the block 1 of the memory 21. In this manner, the first column-first row block 1 is stored in the shift register array 27, when a first carry pulse CAR1 is produced.

It will furthermore be assumed that the selection signal SEL indicates the 90° counterclockwise rotation. A first shift and load clock 1 (FIG. 7) of the shift and load clock sequence SLK is produced soon following the first carry pulse CAR1. The picture elements or binary bits are simultaneously shifted in the shift register array 27 in the direction from the first stages of the respective unit shift registers towards the eighth stages. At the same time, the load circuit 28 is loaded with the binary bits previously stored in the eighth stages of the respective unit shift registers. A first write clock 1 of the write clock sequence WK next follows. At this instant, the write address signal WA is indicative of the address of the first word 1 in the first column-fourth row block 2 of the second memory 22. The picture elements with which the load circuit 28 is loaded, are simultaneously written as the first word 1 (the top line of FIG. 3(A)) in the indicated block 2 of the second memory 22. In this manner, the first column-first row block 1 of the first memory 21 is moved to the first column-fourth row block 2 of the second memory 22, with the block 1 of the first memory 21 given the 90° counterclockwise rotation.

Such processes are repeated for the respective blocks of the first memory 21. A rotated pattern is stored in the second memory 22, when a third carry pulse CAR3 (FIGS. 7 and 9) is produced. It is now understood that the load circuit 28 may be a parallel input-parallel-output register. For use in obtaining a 0°-rotated pattern in the second memory 22, the picture elements or binary bits are supplied from the first memory 21 directly to the load circuit 28 through a connection 49.

On giving the original pattern the 90° clockwise rotation, it is necessary as will be clear from the comparison of the eighth bits 8's of the respective words A through H illustrated in FIG. 2 with the first word 1 shown in FIG. 3(A) and with the first word (bits H1, G1, ..., and A1) depicted in FIG. 4(A) that a set of parallel bits supplied to the load circuit 28 should be produced therefrom as another set of parallel bits of the reversed order. It is furthermore necessary that the three-bit write counter 43 be controlled by the selection signal SEL so as to count down the write clocks WR as soon as set to the full count by the high read-write signal WR.

On giving the original pattern the 180° rotation, it is necessary as will clearly be understood by comparison of the first word A depicted in FIG. 2 with the first word 1 (bits H8, H7, ..., and H1) shown in FIG. 5(A) that the picture elements be supplied from the first memory 21 directly to the load circuit 28 through the connection 49 with the selection signal SEL made to control the load circuit 28 as in the 0° rotation and furthermore as described in conjunction with the 90° counterclockwise rotation. Moreover, the fourth through the second bits K4 to K2 of the write address signal WA should be produced as in the case of the 90° clockwise rotation. Such control is feasible by the selection signal SEL.

Referring now to FIG. 11, a pattern rotating device according to a second embodiment of this invention comprises similar parts designated by like reference numerals. The device being illustrated comprises a single memory 51 for preliminarily storing an original pattern and later for storing a rotated pattern. Before storage of the rotated pattern in each block of the single memory 51, the picture elements or binary bits preliminarily stored in that block must temporarily be transferred to a buffer memory. The buffer memory may merely be a register capable of registering each of the blocks 1 through 16 from time to time. Alternatively, the buffer memory may be a second shift register array 52. The above-described shift register array 27, which will now be called a first register array, and the second shift register array 52 are alternatingly put into operation by first and second sequences SLK1 and SLK2 of shift and load clocks as will presently become clear. Use of such two shift register arrays 27 and 52 enables a higher-speed operation than the use of a mere register as the buffer memory. The first and the second shift register arrays 27 and 52 alternatingly supply the binary bits of the respective unit shift register stages to a load circuit 53 as will shortly be described.

In operation, it will be surmised that the selection signal SEL indicates the 90° counterclockwise rotation.

At first, the control circuit 26 supplied the single memory 52 with the read address signal RA which successively indicates the words A through H of the first column-first row block 1. The block 1 is written in the first shift register array 27 as described in conjunction with the pattern rotating device of FIG. 1.

Next, the read address signal RA is made to indicate the first word A (FIG. 2) of the block in which the eighth bits 8's of the respective words A through H of the block 1 should be stored as the first word 1 (bits A8, B8, . . . , and H8 shown in FIG. 3(A)) of the rotated pattern. The block in question is the first column-fourth row block 2. Responsive to the read address signal RA, the first word A of the block 2 is transferred into the eighth unit shift register of the second shift register array 52. The write address signal WA is now made to indicate the first word 1 of the block 2. A clock of the first shaft and load clock sequence SLK1 moves the eighth bits 8's to the load circuit 53. The write clock WK stores the eighth bits 8's in the block 2 as the first word 1 of that block of the 90° counterclockwise rotated pattern.

In this manner, the words B through H of the block 2 are transferred to the second shift register array 52 with the word A of the block 2 gradually moved towards the first unit shift register thereof. In the meanwhile, the bits previously stored in the seventh stages of the respective unit shift registers of the first shift register array 27 are written in the block 2 as the second word of the rotated pattern. Similar write-in of the block 2 is carried out for the third through the eighth words of the rotated pattern.

Responsive to the shift and load clocks of the second sequence SLK2, the bits stored in the second register array 52 are moved to the load circuit 53 successively from the respective unit shift register stages. The load circuit 53 selects the parallel bits supplied from each set of the stages. In the meantime, the words A through H are transferred into the first shift register array 27 from the fourth column-fourth row block 3. Furthermore, the parallel bits are read from the load circuit 53 into the block 3 as the first through the eighth words of the rotated pattern.

Subsequently, the block 3 is read from the first shift register array 27 into the fourth column-first row block 4 through the load circuit 53 with the 90° counterclockwise rotation and with the block 4 meanwhile transferred into the second shift register array 52. The block 4 is next likewise written in the block 1 with the 90° counterclockwise rotation. Thereafter, the blocks 5 through 8 are similarly written in the blocks 6 through 8 and 5, respectively. In this manner, the original pattern previously stored in the single memory 51 is rotated and stored again in the memory 51.

It will now readily be feasible to modify the clock generator 25 and the control unit 26 from those illustrated with reference to FIGS. 6 and 9 to those for use in the pattern rotating device illustrated with reference to FIG. 11. It may be mentioned here that the read out of an address of the single memory 51 is very often followed immediately by the read in at that address. It is therefore preferred to reduce the access time for the single memory 51 by resorting to the read modify write cycle known in the art.

The 90° clockwise rotation is similarly carried out by the use of the circuit illustrated with reference to FIG. 11. For the 180° rotation, it is sufficient to use a register for only one word as the buffer memory. Incidentally, the connection 49 is omitted in FIG. 11.

Finally referreng to FIG. 12, it is preferred that the single memory 51 be connected to a combination of the first and the second shift register arrays 27 and 52 and to the load circuit 53 through a single bus 55 for eight bits. A receiver 56 is interposed between the single bus 55 and the shift register array combination and is enabled by the low read-write signal RW (FIG. 7). A driver 57 is interposed between the single bus 55 and the load circuit 53 and enabled by the high read-write signal RW.

As thus far been illustrated with reference to, among others, FIGS. 1 and 11, the number N of picture elements or binary bits of a word simultaneously subjected to the rotating process, is rendered equal to the number N of picture elements or binary bits which are concurrently read out of the memory 21 or 51 and stored in the memory 22 or 51. This astonishingly reduces the processing time for the rotation as will soon be exemplified. Division of a pattern into blocks enables the pattern rotating device to be compactly implemented.

While this invention has so far been described in connection with only two preferred embodiments thereof, it will now readily be possible for one skilled in the art to carry this invention into effect in various other manners. For example, the pattern may be composed of multilevel picture elements. Alternatively, a colored pattern is equalllly well dealt with.

For instance, let each picture element be represented by two bits. The pattern rotating device illustrated with reference to FIGS. 1 or 11, is operable under the circumstances with each word composed of four picture elements and with each block composed of four words. When the pattern should be given a rotation of b 90° in either of the counterclockwise and the clockwise senses of rotation, the bits should simultaneously be shifted in each unit shift register by a group of two bits.

The memory 21, 22, or 51 may be divided into more than sixteen blocks if the pattern should be represented by an overall matrix of more than thirty-two by thirty-two bits. In this event, the full count of the counters 38 and 44 should be changed so as to harmonize the number of the read and write cycles to the number of blocks.

In a numerical example wherein each block consists of eight eight-bit words as described in conjunction with the pattern rotating device illustrated with reference to FIGS. 1 or 11, a four-megabit original pattern is rotated into a rotated pattern in only 0.7 second by the use of a clock sequence of two megabits per second.

Each block may be rectangular. In this event, the original pattern is read out of the first memory 21 in read-out blocks, each consisting of M N-bit words where M and N are representative of predetermined natural numbers which are different from each other. The rotated pattern is read into the second memory 22 in write-in blocks, each consisting of M N-bit words. The shift register array 27 should be used rather than the connection 49 even on giving either the 0° or the 180° rotation to the original pattern.

What is claimed is:

1. A device for rotation of an original pattern by a preselected number of integral multiples of 90° in order to provide a rotated pattern, said device comprising:

memory means for storing said original pattern, said original pattern being divided into blocks, each block consisting of N N-bit words, where N is representative of a predetermined natural number, said memory means also being for storing said rotated pattern;

first reading means for successively reading said blocks out of said memory, word by word, in order to produce sequences of N words, each sequence comprising a read-out block, said first reading means thereby creating a vacant block in said memory means as the N words of a block are read out;

first and second shift register means for alternately storing said read-out blocks;

second reading means for alternately reading out one of said first and said second shift register means in sequences of N bits to successively produce write-in blocks, each comprising N N-bit words;

loading means for successively writing each of said write-in blocks into a respective one of said vacant blocks which is determined by said rotation of the original pattern;

control means for generating read addresses for said readout block and writing addresses for said write-in block and performing a read-out operation in said first reading means and a write-in operation in said loading means at the same address by a read-modify-write cycle.

* * * * *

UNITED STATES PATENT AND TRADEMARK OFFICE
CERTIFICATE OF CORRECTION

PATENT NO. : 4,636,783

DATED : January 13, 1987

INVENTOR(S) : Takao OMACHI

It is certified that error appears in the above-identified patent and that said Letters Patent is hereby corrected as shown below:

Column 6, line 1, delete "work" and insert --word--;

Column 7, line 43, delete "shaft" and insert --shift--;

Column 8, line 59, delete "b90°" and insert --90°--.

Signed and Sealed this

Fifteenth Day of September, 1987

*Attest:*

DONALD J. QUIGG

*Attesting Officer*      *Commissioner of Patents and Trademarks*